United States Patent [19]
Arvidson et al.

[11] Patent Number: 6,085,586
[45] Date of Patent: Jul. 11, 2000

[54] FLOW METER SYSTEM WITH REMOTE DISPLAYS FOR EACH DISCHARGE

[75] Inventors: Lawrence C. Arvidson, New Brighton; Duane A. Brown, Rockford; Robert S. Horeck, Fridley, all of Minn.

[73] Assignee: Hypro Corporation, St. Paul, Minn.

[21] Appl. No.: 09/159,946

[22] Filed: Sep. 24, 1998

[51] Int. Cl.[7] ............................ G01F 15/14; G01F 7/00; G01F 1/00; B67D 5/00; A62C 35/00
[52] U.S. Cl. ........................ 73/201; 73/861; 73/195; 169/16; 239/74; 222/25; 222/36; 222/40; 222/71
[58] Field of Search ............................ 73/198, 201, 195, 73/196, 197, 861, 861.8; 222/25, 28, 36, 40, 71, 74, 75; 169/5, 14, 16; 239/74

[56] References Cited

U.S. PATENT DOCUMENTS

| | | |
|---|---|---|
| Re. 35,362 | 10/1996 | Arvidson et al. . |
| 3,949,207 | 4/1976 | Savary et al. ............................ 222/71 |
| 4,084,748 | 4/1978 | Anderson et al. ....................... 239/74 |
| 4,495,488 | 1/1985 | Streib ..................................... 73/195 |
| 4,682,711 | 7/1987 | Reighard et al. ....................... 222/75 |
| 4,719,574 | 1/1988 | Duback et al. .......................... 222/71 |
| 4,736,871 | 4/1988 | Luciani et al. .......................... 222/25 |
| 4,986,782 | 1/1991 | Severtson ............................. 73/861.08 |
| 5,029,100 | 7/1991 | Young et al. ............................ 222/75 |
| 5,232,052 | 8/1993 | Arvidson et al. . |
| 5,303,845 | 4/1994 | Osawa ................................... 222/36 |
| 5,310,114 | 5/1994 | Cann ..................................... 73/196 |
| 5,313,548 | 5/1994 | Arvidson et al. . |
| 5,494,112 | 2/1996 | Arvidson et al. . |
| 5,540,102 | 7/1996 | Kindrick ................................ 73/861 |
| 5,739,429 | 4/1998 | Schmitkons et al. ................... 73/196 |
| 5,927,400 | 7/1999 | Bononi et al. .......................... 73/198 |
| 5,927,603 | 7/1999 | McNabb ................................ 239/74 |
| 5,986,573 | 11/1999 | Franklin et al. ........................ 73/195 |

*Primary Examiner*—Max Noori
*Assistant Examiner*—Jagdish Patel
*Attorney, Agent, or Firm*—Nikolai, Mersereau & Dietz, P.A.

[57] ABSTRACT

A system for monitoring the volume rate of flow and total volume of liquid being drawn from a supply by way of a plurality of discharge conduits includes a flow meter transducer for associated individually with each of the discharge conduits with the transducers providing pulse information to associated flow meter circuits that are connected in series relationship with one another and to a master control module. Each of the individual flow meter circuits includes a pair of microprocessors, one for determining from the pulse information of its associated transducer the volume rate of flow of liquid out its associated discharge conduit. The second microprocessor is programmed to combine the flow information from its own transducer with combined flow information from an adjacent upstream flow meter circuit in the series string and produces a combined flow output signal for delivery to an adjacent downstream flow meter circuit. In this fashion, flow information associated with each of the discharge conduits can be individually displayed with the total volume rate of flow information being presented on a visual display associated with the master controller.

2 Claims, 2 Drawing Sheets

FLOW METER SYSTEM WITH REMOTE DISPLAYS FOR EACH DISCHARGE

BACKGROUND OF THE INVENTION

I. Field of the Invention

This invention relates generally to apparatus for monitoring the volume of liquid being drawn from a supply by way of several discharge conduits, and more particularly to a network flow meter devices interconnected to provide indications of volume rate of flow and total flow from each of the plurality of discharge conduits and the total flow from all such discharge conduits.

II. Discussion of the Prior Art

In fire-fighting systems where water is supplied from a tank on a fire truck, from a municipal hydrant or from another source such as a swimming pool or lake, a so-called mid-ship pump is used to deliver water at high pressure and flow rates to a plurality of discharge conduits on the fire truck. Such a truck may, for example, have a water cannon for delivering water at up to 1,000 gallons per minute, several 1¾ to 2½ inch diameter attack hoses for directing water onto burning structures at up to 120 gallons per minute and 1 inch diameter hand lines for extinguishing smaller fires and extinguishing "hot-spots" once the fire has been brought under control. Such hand lines may deliver 60 to 90 gallons/minute. In such systems, it is important to know at all times the total amount of water that has been drawn from a tank on the fire truck or from the other water supplies as well as the volume rate of flow and the total flow from each of the separate hoses and lines. This is especially true when a liquid chemical foamant concentrate is being added to the water stream. It is important from the standpoint of optimizing the retardant properties of the water foamant mixture that the precise amounts of foamant concentrate be added to the water stream to maintain a predetermined concentration of the water/foamant mixture.

U.S. Pat. Nos. 5,313,548; 5,232,052; 5,494,112 and RE 35,362 owned by applicants, assignee describe a computer-based system for delivering metered quantities of foam concentrate to a water stream so as to maintain the desired concentration. The system includes a positive displacement pump and a drive motor therefore whose speed can be varied over a wide range to deliver a foam concentrate from a supply tank thereof to a discharge conduit. Associated with the main discharge conduit is a flow meter transducer that feeds information into a microprocessor as to the existing flow rate of liquid through the main discharge conduit and this information is processed to cause the motor to drive the foam concentrate pump at a rate to maintain a preprogrammed foam/water concentration in the stream being delivered out the discharge conduit. Also associated with the microprocessor is a visual display panel which is used to provide a visual indication to the operator of the volume rate of flow and the total flow during a given time period.

When it is recognized that a fire truck may have a plurality of discharge conduits, it is desirable that each individual discharge conduit have its own flow meter transducer and circuitry for displaying the volume rate of flow and total flow out each of the plural discharge conduits. Moreover, it is advantageous that provision be made for computing and displaying the total flow out of all of the plural discharge conduits. This allows a fire fighter on board a fire truck to more readily monitor the volume of water being directed on to a fire and the rate at which an existing supply is being exhausted.

Knowing the volume of water being directed onto the fire in a multi-story building allows a determination of when the weight of the water may be approaching a level where the collapse of a floor may be expected. Firefighters may then be radioed to retreat from the building in advance of any structural failure brought on by the weight of the water delivered. Knowing when the existing supply of water is exhausted will permit the fire-fighters to leave an area before the supply runs dry. Furthermore, knowing the size and strength of a fire-fighter and the flow from the hose he or she is handling, the flow can be adjusted to accommodate that person's capability to hold the hose.

SUMMARY OF THE INVENTION

The present invention provides a system for measuring and displaying the volume of a liquid being drawn from a supply by way of a plurality of discharge conduits. Each of the discharge conduits has associated with it a flow meter circuit that includes a flow transducer for producing pulses at a frequency proportional to the rate of flow of liquid through its associated discharge conduit. Each of the flow meter circuits is connected in a series configuration and each of the flow meter circuits includes microprocessor means that counts the pulses from the flow transducers and converts the count to volume rate of flow data and total flow data. The microprocessor means in each of the flow meter circuits further includes a means for receiving volume rate of flow data from an adjacent upstream flow meter circuit in the series configuration and for producing a combined volume rate of flow value to an adjacent downstream flow meter circuit in the series configuration. An alpha/numeric display means is coupled to the microprocessor means in each of the flow meter circuits for providing a visual manifestation of the volume rate of flow and total flow data through its associated discharge conduit.

It has been found convenient to include two microprocessors in each of the series connected flow meter circuits. The first microprocessor has an input for receiving pulses from its associated flow transducer and an output for delivering the volume rate of flow data proportional to the pulse count. The second microprocessor includes a first input coupled to the output of the first microprocessor and a second input for receiving the volume rate of flow data from the adjacent upstream flow meter circuit and an output for delivering the combined volume rate of flow value to its adjacent downstream flow meter circuit.

DESCRIPTION OF THE PREFERRED EMBODIMENT

The present invention will be described in a fire-fighting application, but those skilled in the art will appreciate that the invention may be otherwise applied to any liquid distribution system wherein a liquid is being pumped from a supply, such as a water tank 10, and delivered through a plurality of discharge conduits, here shown as six hoses 12, 14, 16, 18, 20, 22. In a fire-fighting application, the water tank 10 may be carried by a fire truck having a mid-ship pump 24 delivering water under high pressure and flow rate to the hoses via a manifold 26. Valves, not shown, may be provided to allow the control of water from the discharge conduits. A typical mid-ship pump is able to deliver 2000 gallons-per-minute at pressures of from 100 to 200 psi. The discharge conduits or hoses may be of differing diameter with smaller diameter hoses being used as "hand lines" for extinguishing small brush fires or putting out "hot spots" and smoldering embers at the site of a building fire once the main blaze has been extinguished. Another, larger diameter hose may lead to a turret-mounted water cannon designed to deliver a stream of water over a considerable distance and at a high volume rate of flow. Still other of the hoses may be conventional 1¾ inch diameter fire-fighting hoses of the type commonly used on fire trucks.

In carrying out the invention, the water supply need not be a tank, as at 10, but may just as well comprise a supply of water, such as a residential swimming pool, or any other supply of water, such as a lake or pond.

Figure 1:
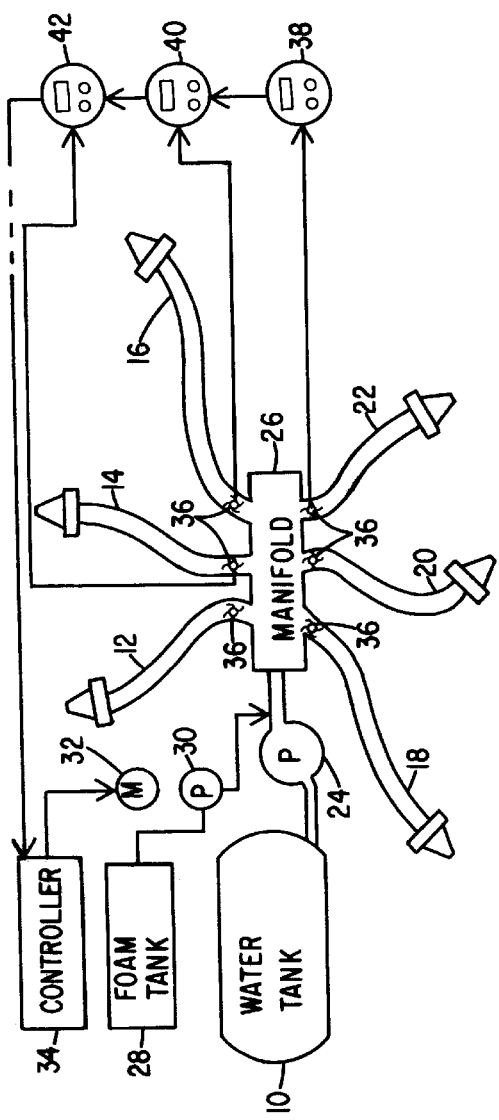
FIG. 1 is a schematic diagram of a fluid handling system with which the present invention finds application.

The system represented in FIG. 1 is also shown as including a foam injection system, such as of the type described in the afore-listed patents and sold by applicants' assignee, Hypro Corporation, under the trademark FOAM-PRO®. That system includes a tank 28 for containing a supply of a foam concentrate that is injected by way of a positive displacement pump 30 into the output stream from the water supply pump 24. The foam injection pump 30 is driven by a DC motor 32, the speed of which is modulated by a microprocessor-based controller 34. This allows precise control over the concentration of foamant relative to the volume of water being delivered. Those desiring a detailed description of the construction and operation of the foam injection system are referred to the aforereferenced patents, the contents of which are hereby incorporated by reference.

With continued reference to FIG. 1, there is shown associated with each of the discharge conduits 12–22 a flow meter transducer as at 36. Without limitation, they may comprise paddle-wheels positioned in the streams exiting the manifold 26 and mounted on each is a magnet or metallic insert that rotates with the paddle-wheel and cooperates with a stationary inductive coil or oscillator coil (not shown) closely positioned relative to the path of travel of the magnet or metallic insert so as to produce electrical pulses at a rate proportional to the rate at which the paddle wheel is driven by the water streams flowing through the discharge conduits.

Figure 2:
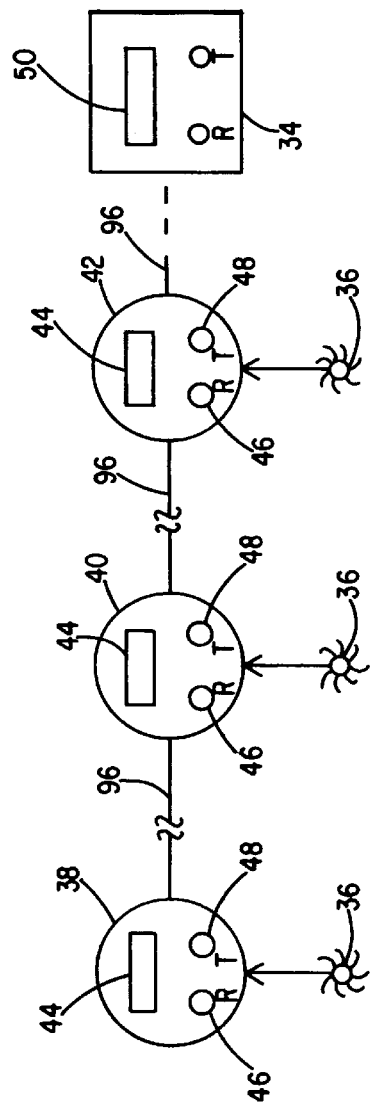
FIG. 2 is a schematic electrical diagram of a flow meter system showing a plurality of flow meter circuits connected in series with one another and to a controller.

Referring to FIG. 2, each of the flow meter transducers 36 feeds the pulses to an associated flow meter circuit as at 38, 40 and 42. The flow meter circuits each include an alpha/numeric display panel 44 and manually operable push-button switches 46 and 48, allowing an operator to selectively display the volume rate of flow through a particular discharge conduit, as well as the total flow through that conduit over a predetermined time interval. The push-button for selecting rate of flow is labeled "R" and that used for displaying total flow by the letter "T".

In accordance with the present invention, the individual flow meter circuits 38, 40 and 42 (there being one for each of the discharge conduits) are connected in a series string with one another and to the controller 34 which has its own alpha/numeric display panel 50.

As will be described in greater detail hereinbelow, each of the flow meter circuits is able to receive flow information from an adjacent upstream flow meter circuit, combine that information with flow information derived from its own flow meter transducer and pass the combined flow information on to an adjacent downstream flow meter circuit. However, the flow meter circuits 38, 40 and 42 are only able to provide a visual display of rate of flow and total flow derived from its own flow meter transducer 36. The controller 34, however, displays the rate of flow and total flow for all of the discharge conduits as combined or total quantities, i.e., the sum of the individual readings from all of the flow meter circuits used in the system.

The individual flow meter circuits 38, 40, 42 may be separately located on the fire truck, but preferably will be clustered at a main control panel along with the controller 34 including a display 50 so that the fire captain can read at a glance the volume rate of flow and the total flow exiting each of the discharge conduits, as well as the rate of flow and total flow for all of the discharge conduits combined.

Figure 3:
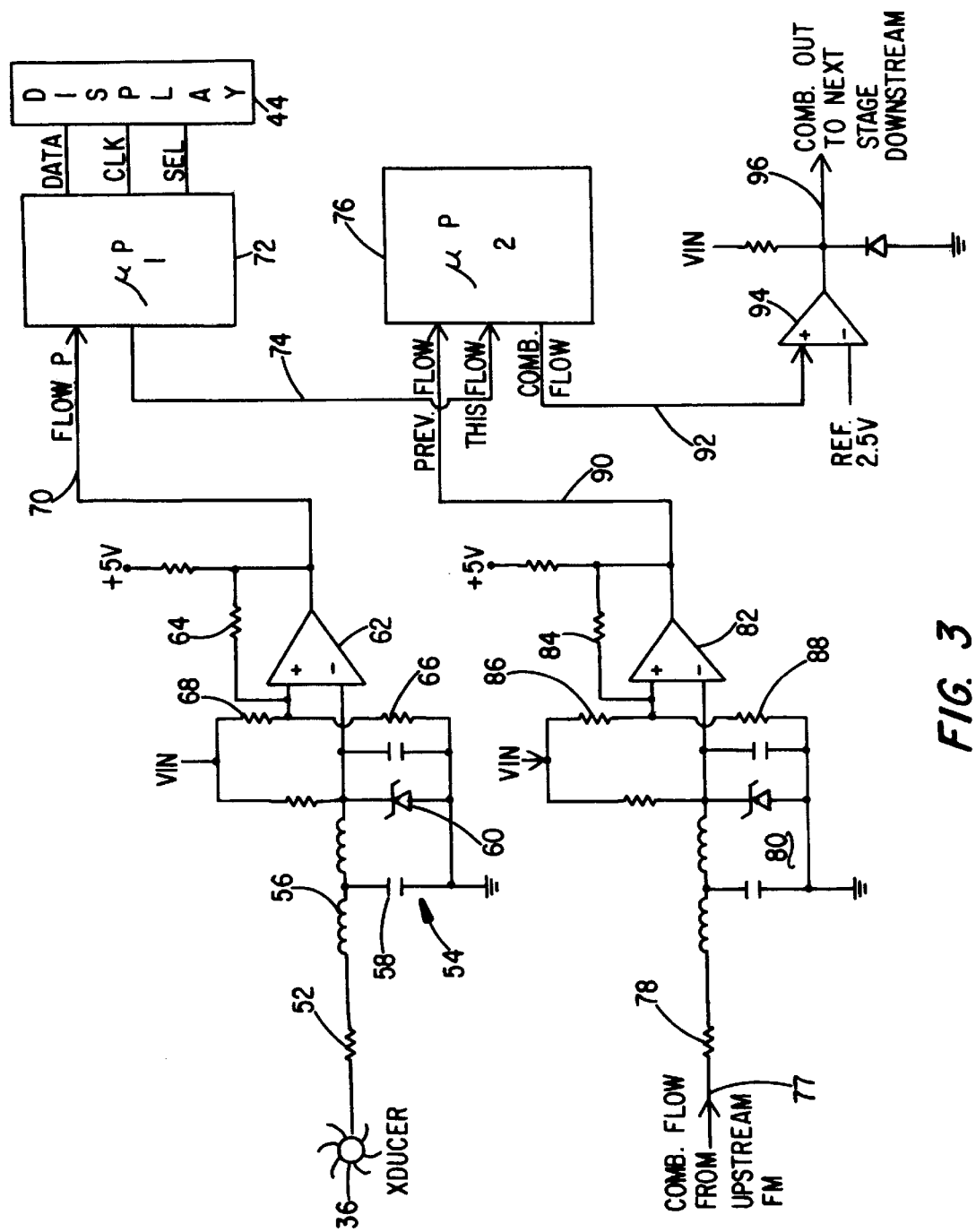
FIG. 3 is an electrical schematic diagram of the circuitry employed in each of the flow meter circuits of FIG. 2.

FIG. 3 is an electrical schematic diagram of the circuitry employed in implementing each of the individual flow meter circuits 38, 40 and 42. Not shown in FIG. 3 is the power supply for converting the output of the fire truck's generator to a filtered and regulated DC output of +5 volts that is used to power the circuitry illustrated. Such power supplies are entirely conventional and need not be described herein because persons of ordinary skill in electronic design are able to devise a DC-to-DC switching regulator capable of converting either a 12 volt DC supply or a 24 volt DC supply down to a 5 volt level.

The output from the magnetic coil of the transducer 36 is applied through a coupling resistor 52 to a pulse limiter circuit indicated generally by numeral 54. It includes a LC filter, including a center-tapped inductor 56 and a shunt capacitor 58, along with a clamping diode 60. The shaped and limited pulses from the transducer 36 are then applied to the inverting input of comparitor 62. Without limitation, the device 62 may comprise an LM 339 device available through National Semiconductor Corporation. The output from the op amp 62 is fed back through a resistor 64 to the non-inverting input thereof and a voltage divider, comprising series connected resistors 66 and 68, applies a predetermined bias to the non-inverting input. The op amp 62 thus functions such that when the input signal to the inverting input exceeds a predetermined level, it is considered as a valid pulse and is applied, via conductor 70, to an input of a first microprocessor 72. The flow meter transducer 36 produces a predetermined number of pulses per gallon of liquid flowing through the particular discharge conduit and the microprocessor is programmed to count such pulses and convert the pulse count to a gallons-per-minute reading for presentation on a digital display panel 44. The manner in which a microprocessor provides digital data, clock information and selection control signals to a serial display driver is well-known to persons skilled in the design of microprocessor-based control systems and is explained in the data sheets for these off-the-shelf components.

The flow information computed by the microprocessor 72 is also delivered by way of a serial bus 74 to an input of a second microprocessor 76, along with pulse count information from an adjacent upstream flow meter. The second microprocessor 76 is programmed to sum the flow information from the upstream flow meter circuits with the flow information derived from its own flow meter transducer to produce an output equal to the resulting total. This combined flow information is then passed on to an adjacent downstream flow meter circuit. More particularly, the previous or combined flow from an adjacent upstream flow meter circuit is applied via a coupling resistor 78 and a filtering and shaping circuit 80 to the inverting input of a comparitor 82. Without limitation, it may comprise a Type LM339 comparitor chip. The comparitor 82 has a feedback network including resistor 84 and the voltage divider comprising series connected resistors 86 and 88. The output from the comparitor 82 is connected to an input pin of the second microprocessor 76 via connector 90.

The combined flow information from the second microprocessor 76 is applied, via a conductor 92, to an non-inverting input of an op amp 94 that is configured to function as a cable driver whereby the combined flow pulse count information may be delivered to the input terminal 77 of the adjacent downstream flow meter circuit, via cable 96. In that each of the flow meter circuits is not required to display its combined flow information, there are no connections between the second microprocessor 76 and the alpha/numeric display device 44.

Referring again to FIG. 2, it can now be seen that the input to the controller module 34 comprises a combined outputs from each of the plurality of flow meter circuits 38, 40, 42, etc., and based upon the total pulse count information which it receives, the microprocessor contained therein may compute the combined flow rate from all of the discharge conduits as well as the total flow from the plurality of conduits during a predetermined time interval.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. Apparatus for measuring and displaying volume rate of flow data and total flow data of fluid being drawn from a plurality of discharge conduits comprising:

(a) a plurality of flow meter circuits individually associated with said plurality of discharge conduits, said plurality of flow meter circuits being connected in series relation with each other;

(b) each flow meter circuit including:

(i) a flow transducer producing pulses at a frequency proportional to a rate of flow of the fluid passing through an associated discharge conduit, (ii) a first microprocessor coupled to the flow transducer to receive the pulses, said first microprocessor counting said pulses and converting said pulses count into the volume rate of flow data and total flow data, (iii) a second microprocessor including a first input coupled to a first output of the first microprocessor for receiving the volume rate of flow data from an associated flow meter circuit, a second input for receiving volume rate of flow data from an adjacent upstream flow meter circuit in the series relation, said second microprocessor programmed to compute a combined volume rate of flow value from the adjacent upstream flow meter circuit and the associated flow meter circuit, and an output coupled to an adjacent downstream flow meter circuit in the series relation for delivering the combined volume rate of flow value; and (c) a visual display device coupled to a second output of the first microprocessor for selectively providing a visual manifestation of said volume rate of flow data and total flow data from the associated discharge conduit.

2. A fluid handling system including at least one fluid supply reservoir connected to a manifold, a plurality of fluid discharge outlets in fluid communication with said manifold, a flow meter system for measuring and displaying a volume rate of flow data and total flow data of said fluid from each of said plurality of fluid discharge outlets and for displaying a total flow and individual flow of said fluid from said plurality of fluid discharge outlets, said flow meter system comprising in combination:

(a) a plurality of flow meter circuits, each of said plurality of flow meter circuits including.

(i) a flow responsive transducer producing output pulses at a rate proportional to the volume rate of flow of said fluid across said flow responsive transducer, (ii) a first microprocessor coupled to said flow responsive transducer to receive the output pulses, said first microprocessor programmed for counting the output pulses and converting the output pulses count into the volume rate of flow data and total flow data of said fluid, (iii) alpha/numeric display means coupled to the first microprocessor for selectively displaying the volume rate of flow data and total flow data of said fluid, (iv) a second microprocessor coupled to the first microprocessor for receiving the volume rate of flow data;

(b) said plurality of flow meter circuits being connected in a serial string with a controller for selectively displaying the total flow and individual flow of said fluid from said plurality of discharge outlets;

(c) the second microprocessor in one of the flow meter circuits receiving the volume rate of flow data from the first microprocessor of same said one of the flow meter circuits and a volume rate of flow data from a second microprocessor of an adjacent upstream one of the flow meter circuits and programmed to compute a combined volume rate of flow value from said adjacent upstream one of the flow meter circuits and the same said one of the flow meter circuits; and (d) means for applying the combined volume rate of flow value from said one of the flow meter circuits to a second microprocessor of a downstream one of the flow meter circuits.

* * * * *